DEFENSIVE PUBLICATION

UNITED STATES PATENT OFFICE

Published at the request of the applicant or owner in accordance with the Notice of Dec. 16, 1969, 869 O.G. 687. abstracts of Defensive Publication applications are identified by distinctly numbered series and are arranged chronologic The heading of each abstract indicates the number of pages of specification, including claims and sheets of drawings conta in the application as originally filed. The files of these applications are available to the public for inspection and reproduc may be purchased for 30 cents a sheet.

Defensive Publication applications have not been examined as to the merits of alleged invention. The Patent Office m no assertion as to the novelty of the disclosed subject matter.

PUBLISHED SEPTEMBER 29, 1970

878 O.G. 1147

T878,012

FINISH COMPOSITION FOR TEXTILE FIBERS

Neil Lamar Finch, Kinston, N.C., assignor to E. I. du Pont de Nemours and Company, Wilmington, Del., a corporation of Delaware

Filed Jan. 15, 1969, Ser. No. 791,501
**Int. Cl. D06m *15/66***
U.S. Cl. 252—8.9
No Drawing. 7 Pages Specification

A finish for synthetic fibers used in seat belts comprises (a) about 80 to 99 parts of a random copolymer of ethylene oxide and 1,2-propylene oxide having a molecular weight of about 8500 to 21,000; (b) about 2 to 6 parts of octylphenoxy-tetra(ethyleneoxy)ethanol; and (c) about 0.5 to 5 parts of a block copolymer of ethylene oxide and dimethylsiloxane having a molecular weight of about 1500 to 3,000 in which the repeat units from the ethylene oxide comprise about 75 to 90 percent of the copolymer. The finish may also contain about 1 to 5 parts of an antioxidant selected from n-propyl-3,4,5-trihydroxybenzoate, (b) tri(mixed mono- and di-nonylphenyl)-phosphite and (c) 4,4'-butylidene-bis-(6-tert-butyl-m-cresol).

An 840-denier, 140-filament, melt-spun 66-nylon yarn drawn 5.6x having a tenacity of 8.6 gms./denier and an elongation of 18% may be coated with a 20% aqueous dispersion of the described finish with a finish roll just after the filaments of the yarn are extruded from a spinneret and solidify. The yarn has excellent lubricity and retains its inherent dyeability. It does not support growth of bacteria or mold.